United States Patent [19]

Rosenquist

[11] Patent Number: 4,662,643
[45] Date of Patent: May 5, 1987

[54] HEAD GASKET ASSEMBLY FOR CLOSELY ADJACENT CYLINDER BORES AND METHOD OF MAKING SAME

[75] Inventor: Gerald A. Rosenquist, Mundelein, Ill.

[73] Assignee: Felt Products Mfg. Co., Skokie, Ill.

[21] Appl. No.: 851,471

[22] Filed: Apr. 14, 1986

[51] Int. Cl.⁴ .............................................. F16J 15/12
[52] U.S. Cl. ................. 277/235 B; 277/232; 277/236; 277/1
[58] Field of Search ................. 277/231–234, 277/235 R, 235 B, 166, 236, 1

[56] References Cited

U.S. PATENT DOCUMENTS

| | | | |
|---|---|---|---|
| 1,843,297 | 2/1932 | Oven | 277/232 |
| 1,847,729 | 3/1932 | Shaw | 277/234 |
| 3,532,349 | 10/1970 | Czernik | 277/235 B |
| 3,784,212 | 1/1974 | Doerfling | 277/235 B |
| 4,330,585 | 5/1982 | Eyrard et al. | 277/235 B |

Primary Examiner—Robert S. Ward
Attorney, Agent, or Firm—Dressler, Goldsmith, Shore, Sutker & Milnamow, Ltd.

[57] ABSTRACT

A head gasket assembly for closely adjacent cylinder bores and method of making the assembly. In the zone of adjacency of the combustion openings in the gasket assembly, part of the gasket body material is absent. Adjacent armoring is joined to form a bridge at the zone of adjacency. The armoring has wires which are substantially greater in thickness than the gasket body material. When the gasket assembly is pre-compressed and compressed in use, the wires in the zone of adjacency are deformed into sealing engagement with each other.

13 Claims, 10 Drawing Figures

U.S. Patent    May 5, 1987    4,662,643
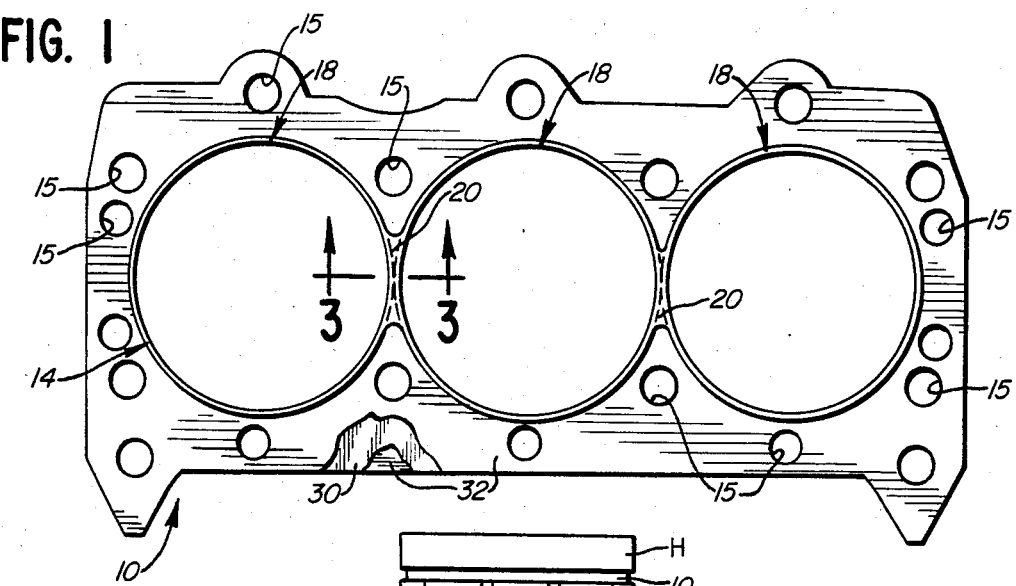
FIG. 1
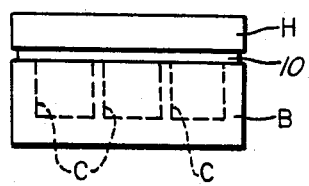
FIG. 9
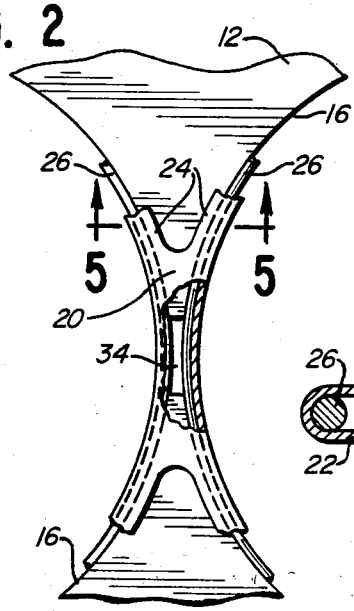
FIG. 2
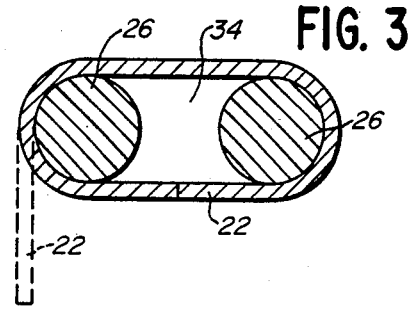
FIG. 3
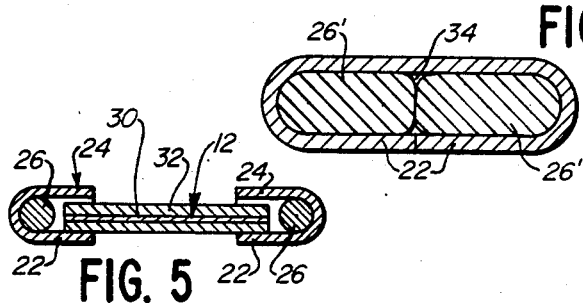
FIG. 4
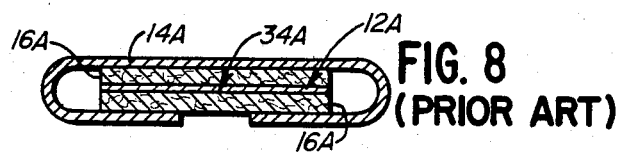
FIG. 5
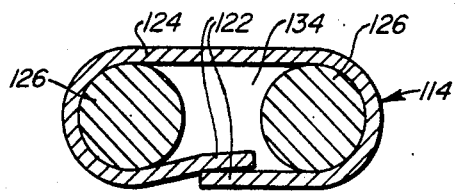
FIG. 6
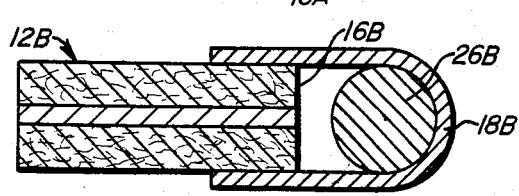
FIG. 8 (PRIOR ART)
FIG. 8A (PRIOR ART)
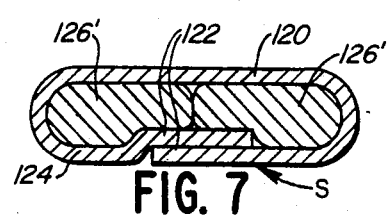
FIG. 7

HEAD GASKET ASSEMBLY FOR CLOSELY ADJACENT CYLINDER BORES AND METHOD OF MAKING SAME

BACKGROUND OF THE INVENTION

To conserve weight and space in engine blocks, it is desirable to minimize the spacing between the bores. The closer together the bores are, the more difficult it is to provide an effective seal with conventional head gaskets, particularly in the zones at which the bores are most closely adjacent.

One of the concerns with head gaskets where bores are closely adjacent is that the gasket body portion disposed between the bores is relied on to provide a seal and, where armoring is used, to mount the armor, thereby to provide an effective seal. As the width of the gasket between the bores decreases, the gasket body becomes increasingly fragile. Thus it may break away altogether, or, if it is a typical laminated gasket body, it may delaminate and thereby become ineffective for the sealing functions for which it was designed.

Therefore head gaskets having improved sealing capacities, particularly gaskets for engines in which the cylinder bores are closely adjacent, is to be desired.

SUMMARY OF THE INVENTION

In accordance with the present invention an improved head gasket assembly for an internal combustion engine is provided.

The head gasket assembly comprises a generally flat main gasket body for sealing communication with at least two complimentary cylinder bores in an engine block.

The gasket body defines at least one pair of adjacent combustion openings. The gasket body defines an elongate zone of adjacency between a pair of combustion openings from which gasket body material is absent. Armoring is provided for the combustion openings and comprises a pair of armor sections connected by a bridge in the zone of adjacency. The armor sections each include an upper leg and a lower leg to define, in cross-section, a U-shaped annulus for sealing the peripheries of the combustion openings.

A wire is disposed in each armor section. The wires lie in close proximity to each other in the zone of adjacency. Prior to compression the wires are greater in thickness by at least about 10 to 20% than the thickness of the gasket body. The wire rings are spaced from each other in the zone of adjacency prior to compression. After compression they are in sealing engagement with each other.

In one form, the lower legs of the armor sections are in butting relationship in the zone of adjacency. In a preferred form the lower legs of the armor sections are in an overlapping relationship in the zone of adjacency, thereby to produce a higher sealing stress in the zone of the overlapping relationship.

Preferably the wires are of a relatively soft metal having a high heat conductivity, such as copper. The wires may be generally circular or, in some applications, oval in cross-section prior to compression. Preferably the wires, prior to compression, are substantially greater in thickness or diameter than the thickness of the main body portion.

Gaskets in accordance with this invention permit the cylinder bores of internal combustion engines to be more closely spaced, which providing effective seals at and around combustion cylinders.

The method of the present invention comprises the steps of providing a head gasket body, forming an elongate zone of adjacency of a pair of combustion openings from which gasket body material is absent, and providing armoring for the combustion openings, the armoring having a bridge in the zone of adjacency. Wires of a thickness greater than the gasket body thickness are provided in the armor. The wires lie in close proximity to each other in the zone of adjacency. The asssembled gasket assembly, and particularly the wires, are then pre-compressed to deform the wires into sealing engagement with each other in the zone of adjacency.

Further objects, features and advantages of the invention will become apparent from the following description and drawings.

BRIEF DESCRIPTION OF THE DRAWINGS

FIG. 1 is a plan view of a head gasket in accordance with the present invention;

FIG. 2 is an enlarged, fragmentary view of FIG. 1, partially broken away, showing a pair of adjacent combustion openings;

FIG. 3 is cross-sectional view taken substantially along line 3—3 of FIG. 1;

FIG. 4 is a cross-sectional view, like FIG. 3, but after compression;

FIG. 5 is a cross-sectional view taken substantially along line 5—5 of FIG. 2;

FIG. 6 is a cross-sectional view of a further embodiment taken in the same location as that shown by line 3—3 of FIG. 1;

FIG. 7 is a cross-sectional view, like FIG. 6, but after compression;

FIG. 8 is a cross-sectional view of a prior art head gasket construction as though taken substantially at the location of line 3—3 of FIG. 1;

FIG. 8A is a cross-sectional view of a typical prior art armoring utilizing a wire; and FIG. 9 is a schematic side elevational view of an engine assembly in which the gasket of FIG. 1 may be used.

DESCRIPTION OF THE PREFERRED EMBODIMENT

Referring first to FIGS. 1–5, a head gasket assembly 10 of the present invention is seen to comprise a generally flat main gasket body 12 which defines a plurality of combustion openings 16, suitable oil, water and bolt openings 15, and armoring 14 for the combustion openings 16. In FIG. 1 a head gasket assembly having three combustion openings 16 is shown for sealing communication with an engine block B having cylinder bores C and a head H, see FIG. 9, typically for one side of a V-6 engine. Thus, the head gasket assembly armoring 14 may be desirably formed to cooperate with three combustion openings. It is clear that any multiple cylinder engine where at least one pair of cylinder bores are closely adjacent to each other will benefit from the practice of the present invention.

As best seen in FIGS. 1 and 2 the armoring 14 comprises three circular armor sections 18. Each section 18 merges in a zone adjacent to the next adjacent armor section in a bridge 20. Bridges 20 connect the sections to form a unitary series of armor sections 18 comprising armoring 14.

Prior to assembly with the main body 12, each of the armor sections 18 defines a lower leg 22 which extends generally vertically away from the bridge 20 and the upper leg 24 of the armor section (see FIG. 2). When in that position, the armor sections are adapted to receive the wires 26 which, in the zones of adjacency 34 are spaced but in close proximity to each other. Desirably the wires 26 are circular in cross-section, although other shapes, such as oval shapes, may be used as well. The assembled armor sections and wires are adapted to be juxtaposed with the gasket body 12, following which the lower legs 22 are bent over to define U-shaped annuli about the peripheries of the combustion openings 16, thereby to secure the armoring 14 to the main body 12, generally as illustrated by FIG. 5, to provide an integrated head gasket assembly 10. In the embodiment shown the combustion openings 16 are generally circular. As such the armor sections 18 which sealingly embrace the peripheries of the openings are also generally circular.

The main gasket body 12 typically may comprise a laminate, such as of an imperforate metallic core 30, and a pair of facing sheets 32. Facing sheets 32 are a fiber reinforced composite and are laminated to core 30. The most popular and frequently used facings incorporate asbestos or glass fibers and utilize nitrile, neoprene or polyacrylic elastomers to provide the self-sustaining facings. In the embodiment illustrated, the facings may have a thickness of about 0.015 inch, although, of course, this may vary with the application. Facing sheets 32 generally resist degradation by oils and coolants, retain torque, minimize extrusion, and exhibit heat resistance.

The main gasket body 12 is die cut or blanked out, such as with a stamping machine, punch press or other suitable form of equipment to provide three combustion openings, bolt holes 15 and a plurality of fluid flow passageways, such as oil and water passageways 15. A typical gasket assembly body having the configuration shown in FIG. 1 has a thickness of about 0.043 inch. Other configurations and thicknesses may be used depending upon the configuration and requirements of the engines with which the gasket assembly is to be used.

From FIGS. 2 and 3 especially, it will be apparent that the main gasket body has a small portion cut-out in the zone of adjacency of pairs of cylinder bores C. The absence of the body material in this narrow, elongated zone of adjacency 34 makes it possible, as will appear, effectively and consistently to produce gasket assemblies 10 which will seal the closely adjacent combustion openings 16.

The wires 26 are substantially oversized as compared to typical wires used in armored head gaskets. Indeed prior to compression the armoring 14 is also initially substantially oversized as compared to the typical armoring of armored head gaskets. In this regard FIGS. 8 and 8A, showing prior art, are instructional.

In FIG. 8, a typical automotive head gasket used in the same environment as FIG. 1 is shown, i.e., at the location of FIG. 3. As there seen, there are no wires and the main gasket body 12A continues across the zone of adjacency of adjacent combustion openings 16A. When the width of the zone of adjacency 34A diminishes, the body 12A thereat tends to delaminate or fracture. This limits the minimum spacing permissible and may also result in main gasket bodies which may fracture from time to time. Also, as seen in FIG. 8, the armoring 14A closely grips the main body 12A, the main body 12A, in the zone of adjacency 34A, initially having approximately the same thickness as the gasket as seen in FIG. 8, and substantially the same thickness as the overall main gasket body 12A.

In FIG. 8A, a typical prior art gasket assembly using armoring and a wire ring is shown. There the armor 18B houses a wire 26B which grips the periphery of a combustion opening 16B. The final thickness of the armor and wire is slightly greater than the thickness of the main gasket body 12B, the diameter of the wire ring 26B initially being no more than, and preferably less than, the thickness of the main body 12B.

By contrast with such prior art, several things will be apparent. First, the zone of adjacency 34 is deliberately cut-out from the main gasket body 12 leaving an open space between adjacent combustion openings 16, as seen in FIGS. 2 and 3. Next, the armoring, in the zone of the bridge 20 and in the zone of adjacency 34, houses a pair of annular wires 26, which may be butt-welded, one for each of the combustion openings 16. Additionally, the wires 26 are substantially oversized, i.e., are substantially greater in thickness than the thickness of the main gasket body, preferably by at least about 10 to 20%. Indeed, as shown by FIG. 5 the wires are much greater in thickness than the main gasket body, in which event in the zone of adjacency and in the zone of the bridge, as well as elsewhere, at least one of the legs 22 and 24 of the armoring 14 will stand off somewhat from the main body 12.

Following assembly of the gasket, it is preferably precompressed from the condition shown in FIGS. 3 and 5, to the condition shown in FIG. 4, i.e., the wires are deformed to assume a relationship typified by FIG. 4, thereby to deform the wires into sealing engagement with each other in the zone of adjacency. The precompression of the gasket assembly functions to reduce possible bolt torque loss, thereby to produce a gasket which provides a longer-lived, more durable seal.

When the thusly formed gasket assembly is thereafter positioned between a head H and block B, and is torqued down, the precompressed gasket assembly 10 is further compressed and the wires 26 may be further deformed to further alter the shape of the wires, again as illustrated by FIG. 4. It will be appreciated that the wires should, therefore, be reasonably malleable, and to that end wires, such as copper wires or the like, are preferred. Indeed softer wires of a relatively soft metal such as copper which also have a heat conductivity are preferred because they will perform the additional function of transferring heat from the zone of the combustion openings outwardly to be dissipated, thereby minimizing the possibility of heat damage to the main gasket body 12 in use.

It will be appreciated that malleable wires such as copper do not normally serve as effective wires in fire rings. Because the soft copper wire is trapped in the zone of adjacency 34, it functions to cooperate to produce a highly effective fire ring at the zones of adjacency.

Most desirably, the wires 26 are deformed to produce sealing contact or engagement between them, particularly in the zone of adjacency 34, as is illustrated by FIG. 4. As such, despite the absence of the main gasket body 12 in the zone of adjacency 34, an effective seal in that zone for each combustion opening 16 is provided, while additionally providing an effective seal around the entirety of each combustion opening.

It will be apparent that there will be a generally uniform sealing load distribution across the width of the armoring in the zone of adjacency 34 in the embodiment of FIGS. 1-5. To increase the unit loading stress, particularly in the central portion of the zone of adjacency 34, may well be desirable in some circumstances, and FIGS. 6 and 7 illustrate an embodiment by which that may be accomplished.

Referring now to FIGS. 6 and 7, it will be seen that an armoring 114 is provided with a connecting bridge portion 120 in the zone of adjacency 134 of a pair of combustion openings. A wire 126 for each combustion opening is provided. The upper legs 124 which merge in the zone of the bridge 120 is formed with a pair of lower legs 122 which are in an overlapping relationship instead of the butting relationship as was the case in the zone of adjacency 34 of FIGS. 3 and 4. As the gasket assembly employing the embodiment of FIGS. 6 and 7 is compressed from the initially assembled position of FIG. 6 to that of FIG. 7, to produce deformed, compressed wire rings 126, greater sealing stresses develope in the central zone S of overlapping relationship thereby producing an enhanced seal in the zone of adjacency, the zone where the main gasket body is absent.

Gaskets in accordance with the present invention are especially useful in racing engines where maximum bore size tends to be desirable. Such gaskets, however, are useful in other environments as well.

It has been found that a minimum of 0.21 inch appears necessary between adjacent combustion openings when gaskets of the laminated type are used and the gaskets employ plain armored or wire ring head gaskets, all to allow for armor overlap, clearance between adjacent armors, to provide space for wire and back clearance, as well as to prevent breaking off of part of the narrow land area betwen the combustion openings. With gaskets of the present design the space may be as little as about 0.14 inch, allowing a bore diameter of 0.07 inch larger.

The wires used may be copper of a diameter of 0.052 inch which is greater than the thickness of the body. This, in the construction illustrated and described, will provide combustion seals strong enough to resist the compressive forces that occur between the combustion openings.

In the embodiment illustrated, the combined cross-sectional area of the two wires in the zone of adjacency is 30% greater than the cross-sectional area of the estimated armor shape at the minimum calculated compressed thickness. This insures substantially complete filling of the gap between the inside of each armor, forcing excess material into the voids created by the removal of the portion of the gasket body in the zone of adjacency. Where the overlapping armors in the zone of adjacency are used, not only does that aid compressive stress, producing greater unit sealing stress, but it also tends to cover the wires more completely.

It will be apparent to those skilled in the art that variations of the disclosed embodiments may be made without departing from the spirit and scope of the present invention. Accordingly, I do not intend the invention to be limited to the embodiments shown or described, except as may be made necessary by the appended claims.

What is claimed is:

1. A head gasket assembly comprising:
   a generally flat main gasket body for sealing communication with at least two cylinder bores in an engine block, said gasket body defining at least one pair of adjacent combustion openings therein;
   said gasket body defining an elongate zone of adjacency of said pair of combustion openings from which gasket body material is absent;
   armoring for said combustion openings comprising a pair of armor sections connected by a bridge in said zone of adjacency, said armor sections including an upper leg and a lower leg to define, in cross-section, a U-shaped annulus for sealing of the peripheries of said combustion openings; and
   a wire disposed in each said armor section and lying in close proximity to each other in said zone of adjacency, said wires, prior to compression, being of thicknesses which are greater than the thickness of said gasket body.

2. A head gasket assembly in accordance with claim 1, and wherein
   said wire rings are spaced from each other in said zone of adjacency prior to compression and are in sealing engagement with each other after compression.

3. A head gasket assembly in accordance with claim 1, and wherein said lower legs of said armor sections are in butting relationship in said zone of adjacency.

4. A head gasket assembly in accordance with claim 1, and wherein said lower legs of said armor sections are in an overlapping relationship in said zone of adjacency, thereby to produce a higher sealing stress in the zone of said overlapping relationship.

5. A head gasket assembly in accordance with claim 1, and wherein said wires are of a relatively soft metal having a high heat conductivity.

6. A head gasket assembly in accordance with claim 5, and wherein said wires are of copper.

7. A head gasket assembly in accordance with claim 1, and wherein said wires are generally circular in cross-section prior to compression.

8. A head gasket assembly in accordance with claim 1, and wherein said thicknesses of said wires prior to compression are substantially greater than the thickness of said main body portion.

9. A head gasket assembly in accordance with claim 2, and wherein wires are of a relatively soft metal having high heat conductivity and their thicknesses prior to compression, is substantially greater than the thickness of said main gasket body, and wherein said legs overlap the peripheral edges of said combustion openings to seal said armor sections to said main body portion after said wires have been compressed.

10. A method of making an automotive head gasket assembly comprising the steps of
    providing a generally flat main gasket body for sealing communication with at least two cylinder bores in an engine block, said gasket body defining at least one pair of adjacent combustion openings therein;
    forming an elongate zone of adjacency of said pair of combustion openings from which gasket body material is absent;
    providing armoring for said combustion openings comprising a pair of armor sections connected by a bridge in said zone of adjacency, said armor sections including an upper leg and a lower leg to define, in cross-section, a U-shaped annulus for sealing of the peripheries of said combustion openings, and said armoring further including a wire disposed in each said armor section, said wires lying in close proximity to each other in said zone of adjacency, said wires being of thicknesses which are greater than the thickness of said gasket body; then pre-compressing said armoring and said wires to deform said wires into sealing engagement with each other in said zone of adjacency.

11. The method of claim 10, and comprising the further step of butting the lower legs of said armor sections in said zone of adjacency to enclose said wires in said zone of adjacency.

12. The method of claim 10, and comprising the further step in accordance of overlapping said lower legs of said armor in said zone of adjacency, thereby to produce a higher sealing stress in the zone of said overlapping relationship.

13. The method of claim 10, and comprising the step of providing wires which, prior to pre-compression, are substantially greater in thickness than the thickness of said main body portion.

* * * * *